United States Patent
Katayama et al.

(10) Patent No.: US 9,649,950 B2
(45) Date of Patent: May 16, 2017

(54) POWER SUPPLY APPARATUS

(71) Applicant: DENSO CORPORATION, Kariya, Aichi-pref. (JP)

(72) Inventors: Naoki Katayama, Kariya (JP); Toshiyo Teramoto, Okazaki (JP)

(73) Assignee: DENSO CORPORATION, Kariya (JP)

( * ) Notice: Subject to any disclaimer, the term of this patent is extended or adjusted under 35 U.S.C. 154(b) by 130 days.

(21) Appl. No.: 14/796,165

(22) Filed: Jul. 10, 2015

(65) Prior Publication Data

US 2016/0009194 A1   Jan. 14, 2016

(30) Foreign Application Priority Data

Jul. 10, 2014  (JP) .................................. 2014-141970
Jun. 30, 2015  (JP) .................................. 2015-131118

(51) Int. Cl.
*H02J 7/00*   (2006.01)
*B60L 11/18*  (2006.01)
(Continued)

(52) U.S. Cl.
CPC ....... *B60L 11/1868* (2013.01); *B60L 11/1859* (2013.01); *B60L 11/1861* (2013.01);
(Continued)

(58) Field of Classification Search
CPC .............. B60L 11/1838; B60L 2230/00; B60L 2230/34; H02J 7/0027; Y02T 90/125;
(Continued)

(56) References Cited

U.S. PATENT DOCUMENTS

2004/0053083 A1*  3/2004  Kobayashi .............. B60R 16/03
                                                                    429/9
2006/0028778 A1*  2/2006  O'Gorman ............ B60R 16/023
                                                                    361/62
(Continued)

FOREIGN PATENT DOCUMENTS

JP   2011-078147 A   4/2011
JP   2012-080706 A   4/2012
(Continued)

*Primary Examiner* — Arun Williams
(74) *Attorney, Agent, or Firm* — Oliff PLC

(57) ABSTRACT

A power supply apparatus includes a generator, lead-battery, and second-battery. Open-circuit voltages and internal resistances of the batteries are determined so that: there is a point, where the open-circuit voltage of the second-battery coincides with that of the lead-battery, in a region on a smaller-residual-capacity side relative to a range of use in an entire-residual-capacity range of the second-battery; the open-circuit voltage of the second-battery is larger than that of the lead-battery in the range of use of the second-battery; the internal resistance of the second-battery is smaller than that of the lead-battery in a charging state of the generator; and a terminal voltage of the second-battery in a state where a maximum charge current is passed through the second-battery is smaller than a regulated voltage in a power-generation state of the generator. An opening/closing section is closed in at least one of a power-generation state and a load-activated state.

10 Claims, 7 Drawing Sheets

(51) Int. Cl.
  *H01M 10/42* (2006.01)
  *H01M 10/06* (2006.01)
  *H01M 10/44* (2006.01)
  *H01M 10/48* (2006.01)

(52) U.S. Cl.
  CPC ......... *H01M 10/06* (2013.01); *H01M 10/425* (2013.01); *H01M 10/4207* (2013.01); *H01M 10/441* (2013.01); *H01M 10/482* (2013.01); *H01M 2010/4271* (2013.01); *H01M 2220/20* (2013.01); *Y02E 60/126* (2013.01); *Y02T 10/7016* (2013.01)

(58) Field of Classification Search
  CPC ... Y02T 90/164; Y02T 90/165; Y02T 90/166; Y02T 90/14; Y02T 10/7005; Y02T 90/128; Y02T 10/7088; Y02T 90/163
  USPC .......................................................... 320/109
  See application file for complete search history.

(56) References Cited

U.S. PATENT DOCUMENTS

| | | | |
|---|---|---|---|
| 2006/0038532 A1* | 2/2006 | Taniguchi | H02J 7/1423 320/103 |
| 2010/0141213 A1* | 6/2010 | Iida | B60L 1/00 320/134 |
| 2011/0001352 A1 | 1/2011 | Tamura et al. | |
| 2014/0091767 A1 | 4/2014 | Tamura et al. | |
| 2014/0132063 A1* | 5/2014 | Kakiuchi | B60R 16/03 307/9.1 |
| 2014/0225622 A1* | 8/2014 | Kudo | B60L 3/0046 324/433 |

FOREIGN PATENT DOCUMENTS

| | | |
|---|---|---|
| JP | 2012-130108 A | 7/2012 |
| JP | 5471083 B2 | 4/2014 |

\* cited by examiner

POWER SUPPLY APPARATUS

CROSS-REFERENCE TO RELATED APPLICATION

This application is based on and claims the benefit of priority from earlier Japanese Patent Applications No. 2014-141970 filed Jul. 10, 2014 and No. 2015-131118 filed Jun. 30, 2015, the descriptions of which are incorporated herein by reference.

BACKGROUND

Technical Field

The present invention relates to a power supply apparatus installed such as in a vehicle.

Related Art

For example, a well-known in-vehicle power supply system has a configuration that includes a plurality of batteries (e.g., a lead battery and a lithium-ion battery). These batteries are differently used to supply electric power to various electrical loads mounted to the vehicle. Specifically, in the configuration, a rotary electric machine having a function of generating electric power is connected to a lithium-ion battery and a lead battery via a connection path which is provided with a semiconductor switch. The semiconductor switch is opened/closed to electrically disconnect/connect the rotary electric machine from/to the lithium-ion battery and the lead battery. Thus, the lead battery having low durability against frequent charge/discharge (accumulated amount of charge/discharge) is prevented from early deterioration.

Japanese Patent No. 5471083 discloses a technique, according to which, a point where the open-circuit voltage of a lead battery coincides with that of a lithium-ion battery (second battery) is provided in the ranges of use of residual capacity of the lead battery and the lithium-ion battery. According to the technique, battery characteristics are determined so that a relationship of "Li open-circuit voltage>Pb open-circuit voltage" is satisfied on an upper limit side of the point in the range of use of residual capacity of the lithium-ion battery. Thus, while eliminating use of a DC-DC converter to reduce cost, which has been essential in the conventional art, the amount of current flowing from the lithium-ion battery to the lead battery is ensured to be minimized to avoid overcharge of the lead battery.

However, according to the technique disclosed in Japanese Patent No. 5471083, the range where "Li open-circuit voltage>Pb open-circuit voltage" is satisfied and the range where "Li open-circuit voltage<Pb open-circuit voltage" is satisfied are both present within the normal range of use of the second battery. Therefore, in a state of "Li open-circuit voltage<Pb open-circuit voltage", discharge can no longer be preferentially performed from the lithium-ion battery side. This causes a concern that the lead battery would be deteriorated due to the increase of the accumulated amount of discharge of the lead battery.

There is a measure that can be taken against the decrease of the accumulated amount of discharge in the lead battery when the range satisfying "Li open-circuit voltage>Pb open-circuit voltage" and the range satisfying "Li open-circuit voltage<Pb open-circuit voltage" are both present within the range of use of the second battery. As such a measure, for example, the lead battery and the lithium-ion battery may be disconnected from each other (the semiconductor switch in the connection path may be turned off) when the state turns to "Li open-circuit voltage<Pb open-circuit voltage". In this case, however, the semiconductor switch is repeatedly turned on/off, which leads to a probability of causing turn-off failure in the semiconductor switch or imperfect control over the semiconductor switch. There is a concern that such turn-off failure induces power supply loss for the electrical loads. To cope with such power supply loss, a backup circuit is required to be provided to ensure power supply, which however causes a concern of increasing cost.

SUMMARY

An embodiment provides a power supply apparatus which includes a lead battery and a second battery and properly performs charge/discharge of the batteries.

As an aspect of the embodiment, a power supply apparatus includes a generator, a lead battery, and a second battery, the lead battery and the second battery being connected in parallel with the generator. Electric power is supplied from the lead battery and the second battery to an electrical load. The apparatus includes: a protective control section which limits an amount of charge to the second battery to protect the second battery from overcharge, while limiting an amount of discharge from the second battery to protect the second battery from overdischarge, such that a residual capacity of the second battery falls within a predetermined range of use determined in an entire residual capacity range; an opening/closing section which is provided to a connection path electrically connecting between the lead battery and the second battery and is turned on and off to connect and disconnect between the lead battery and the second battery; and an opening/closing control section which controls the opening/closing section. open-circuit voltages and internal resistances of the lead battery and the second battery are determined so that there is provided a point, where the open-circuit voltage of the second battery coincides with the open-circuit voltage of the lead battery, in a region on a smaller residual capacity side relative to the range of use in the entire residual capacity range of the second battery, the open-circuit voltage of the second battery is larger than the open-circuit voltage of the lead battery in the range of use of the second battery, the internal resistance of the second battery is smaller than the internal resistance of the lead battery in a charging state created by power generation of the generator, and a terminal voltage of the second battery in a state where a maximum charge current is passed through the second battery is smaller than a regulated voltage in a power-generation state of the generator. The opening/closing control section makes the opening/closing section an off state in at least one of the power-generation state of the generator and a load-activated state where the electrical load is activated.

DETAILED DESCRIPTION OF THE PREFERRED EMBODIMENTS

With reference to the accompanying drawings, hereinafter is described an embodiment to which the present invention is applied. An in-vehicle power supply apparatus of the present embodiment is installed in a vehicle that runs using an engine (internal combustion engine) as a drive source and has a so-called idle stop function (automatic stop and restart function).

First Embodiment

Figure 1:
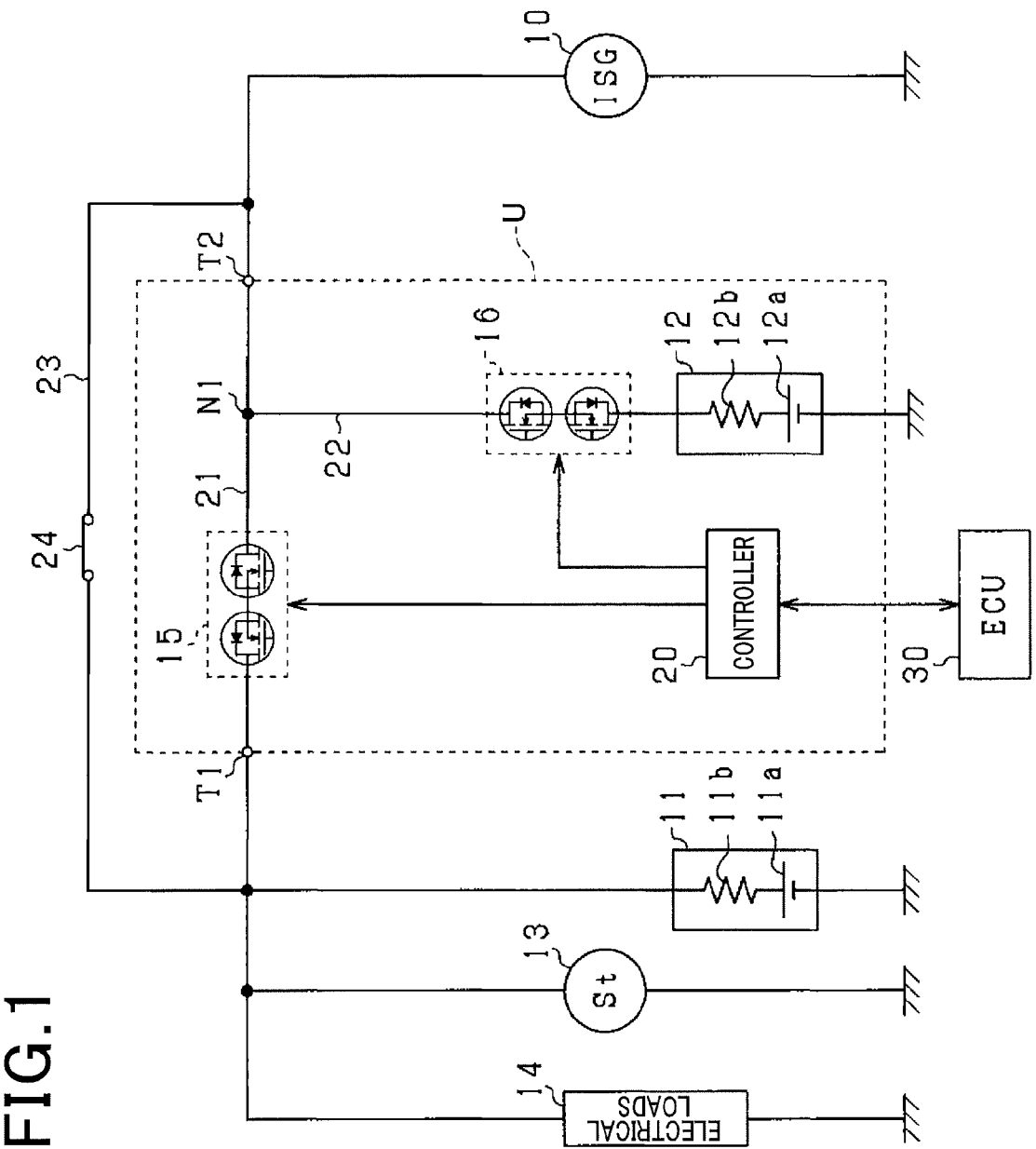
FIG. 1 is an electrical circuit diagram illustrating a power supply system according to a first embodiment.

FIG. 1 is an electrical circuit diagram illustrating a power supply system according to the first embodiment. As shown in FIG. 1, the power supply system of the present embodiment includes a rotary machine 10, lead battery 11, lithium-ion battery 12, starter 13, various electrical loads 14, MOS switch 15 and SMR switch 16. Of these components, the lithium-ion battery 12 and the switches 15 and 16 are accommodated in a housing (accommodating casing), which is not shown, for integration to thereby configure a battery unit U. The battery unit U includes a controller 20 that configures a battery control section (means). The switches 15 and 16 as well as the controller 20 are accommodated in the housing in a state of being mounted on a single substrate.

The battery unit U includes a first terminal T1 and a second terminal T2 as external terminals. The first terminal T1 is connected to the lead battery 11, the starter 13 and the electrical loads 14, while the second terminal T2 is connected to the rotary machine 10. The terminals T1 and T2 serve as high-current input/output terminals through which input/output current of the rotary machine 10 is passed.

The rotary machine 10 has a rotary shaft which is connected, via a belt or the like, to an engine output shaft, which is not shown, so as to be driven. Rotation of the engine output shaft causes rotation in the rotary shaft of the rotary machine 10, while rotation of the rotary shaft of the rotary machine 10 causes rotation in the engine output shaft. In this case, the rotary machine 10 has a generation function of generating (regenerating) electric power with the rotation of the engine output shaft and the axle shaft, and a motive power output function of applying torque to the engine output shaft, thereby configuring ISG (integrated starter generator).

The lead battery 11 and the lithium-ion battery 12 are electrically connected in parallel with the rotary machine 10 to enable charge of the batteries 11 and 12 by the generated power of the rotary machine 10. The rotary machine 10 is ensured to be driven with the power supplied from the batteries 11 and 12.

The lead battery 11 is a well-known general-purpose battery. In contrast, the lithium-ion battery 12 is a high-density battery causing less power loss during charge/discharge and having higher output density and energy density compared to the lead battery 11. In this case, the lithium-ion battery 12 corresponds to the second battery. The second battery may be a battery having a higher output density or energy density than that of the lead battery 11.

Specifically, the lead battery 11 includes lead dioxide ($PbO_2$) as a positive electrode active material, lead (Pb) as a negative electrode active material, and sulfuric acid ($H_2SO_4$) as an electrolyte. The lead battery 11 is configured by serially connecting a plurality of battery cells each including electrodes made of these materials. In the setting of the present embodiment, the lead battery 11 is ensured to have a storage capacity larger than that of the lithium-ion battery 12.

On the other hand, the lithium-ion battery 12 includes an oxide that contains lithium (lithium metal composite oxide) as a positive electrode active material. As a specific example of the lithium metal composite oxide, mention can be made of $LiCoO_2$, $LiMn_2O_4$, $LiNiO_2$, $LiFePO_4$, or the like. The negative electrode active material of the lithium-ion battery 12 that can be used includes carbon (C) or graphite, lithium titanate (e.g., $LixTiO_2$), or an alloy that contains Si or Sn. An organic electrolyte is used as the electrolyte of the lithium-ion battery 12. The lithium-ion battery 12 is configured by serially connecting a plurality of battery cells each including electrodes made of these materials.

In FIG. 1, reference numerals 11a and 12a represent groups of battery cells of the lead battery 11 and the lithium-ion battery 12, respectively, while reference numerals 11b and 12b represent internal resistances of the lead battery 11 and the lithium-ion battery 12, respectively. In the following description, an open-circuit voltage V0 of a battery refers to a voltage generated by the battery cell group 11a or 12a, while a terminal voltage Vd or Vc of a battery refers to a voltage expressed by the following expression (1) or (2).

$$Vd = V0 - Id \times R \qquad (1)$$

$$Vc = V0 + Ic \times R \qquad (2)$$

In the expressions, Id indicates a discharge current, Ic indicates a charge current, R indicates an internal resistance of a battery, and V0 indicates an open-circuit voltage of the battery. As shown in these expressions (1) and (2), the terminal voltage Vd in a discharging state becomes smaller as the internal resistance R becomes larger, while the terminal voltage Vc in a charging state becomes larger as the internal resistance R becomes larger.

The electrical loads 14 include constant-voltage-requiring loads in which the supply power is required to have an almost constant voltage, or the supply power is required to be stable with its variation being within at least a predetermined range. Specific examples of the constant-voltage-requiring loads include a navigation system and an audio system. In this case, suppression of voltage variation can realize stable operation of these systems. Besides, the electrical loads 14 include head lights, wipers such as of a front windshield, a blower of an air conditioner, and a heater for a defroster of a rear windshield. The head lights, wipers, blower and the like require to have supply power of constant voltage because variation in the voltage of the supply power can cause flickering of the head lights, variation in the operating speed of the wipers, or variation in the rotating speed of the blower (variation in the blowing sound).

The battery unit U includes first and second connection paths 21 and 22 as in-unit electrical paths which mutually connect the first and second terminals T1 and T2 and the lithium-ion battery 12. Of these paths, the first connection path 21 connecting between the first and second terminals T1 and T2 is provided with an MOS switch 15 as an opening/closing section (means). On the other hand, the second connection path 22 connecting between a connecting point N1 (battery connecting point) on the first connection path 21 and the lithium-ion battery 12 is provided with an SMR switch 16. The switches 15 and 16 each include 2×n MOSFETs (semiconductor switches). The MOSFETs are connected in series such that the parasitic diodes in a set of two MOSFETs are oriented in mutually opposite directions. When the switch 15 or 16 is turned off by the parasitic diodes, the current passing through the path in which the switch is located is completely interrupted.

The present power supply system includes a bypass path 23 that can connect between the lead battery 11 and the rotary machine 10 not via the MOS switch 15. Specifically, the bypass path 23 is provided such that an electrical path connected to the first terminal T1 (path connected to the lead battery 11 and the like) is electrically connected to an electrical path connected to the second terminal T2 (path connected to the rotary machine 10), taking a detour around the battery unit U. The bypass path 23 includes a bypass switch 24 that disconnects or connects a lead battery 11 side from/to a rotary machine 10 side. The bypass switch 24 is a normally-closed relay switch. It should be noted that the bypass path 23 and the bypass switch 24 may be provided in the battery unit U so as to detour around the MOS switch 15.

The controller 20 switches an on state (closed) of each of the switches 15 and 16 to an off state (opened), or vice versa. In this case, the controller 20 performs on-off control over the MOS switch 15, depending on whether it is the time of discharge when electric power is fed to the electrical loads 14 (time when the loads are activated), whether it is the time of charge when electric power is supplied from the rotary machine 10, or whether it is the time of restart when the engine, which is stopped under idle stop control, is automatically restarted by the rotary machine 10. The details of the on-off control will be described later. The SMR switch 16 is normally and basically retained to be in an on state (closed) and ensured to be turned off (opened) in the event that any abnormality has occurred such as in the battery unit U or the rotary machine 10.

The controller 20 is connected to an ECU 30 which is external of the battery unit. Specifically, the controller 20 and the ECU 30 are connected via a communication network, such as CAN (controller area network), to enable mutual communication, with various data stored in the controller 20 and the ECU 30 being shared with each other. The ECU 30 is an electronic control unit having a function of performing idle stop control. As is well known, under the idle stop control, the engine is automatically stopped when predetermined automatic stop conditions are satisfied, and the engine is restarted when predetermined restart conditions are satisfied in the automatically stopped state.

The rotary machine 10 generates electric power using the rotational energy transmitted via the engine output shaft. Specifically, when the rotor in the rotary machine 10 is rotated by the engine output shaft, AC current is induced in the stator coil depending on the excitation current passing through the rotor coil, and the induced AC current is converted to DC current by a rectifier, which is not shown. The excitation current passing through the rotor coil in the rotary machine 10 is regulated by a regulator to regulate the voltage of the generated DC current into a predetermined regulated voltage Vreg.

The electric power generated by the rotary machine 10 is supplied to the electrical loads 14, while being supplied to the lead battery 11 and the lithium-ion battery 12. When the engine is stopped and thus no electric power is generated by the rotary machine 10, electric power is supplied from the lead battery 11 and the lithium-ion battery 12 to the electrical loads 14. The amount of discharge from the lead battery 11 and the lithium-ion battery 12 to the electrical loads 14 and the amount of charge from the rotary machine 10 are appropriately adjusted within a range for each SOC to become neither an overcharged state nor overdischarged state (SOC range of use). The term SOC refers to a residual capacity that is a proportion of an actual amount of charge relative to an amount of charge in a fully charged state.

In this case, the controller 20 performs protective control such that the SOC of the lithium-ion battery 12 falls within a predetermined range of use (range of use W2 of FIG. 2B described later). To this end, the controller 20 limits the amount of charge to the lithium-ion battery 12 to protect the battery 12 from overcharge, while limiting the amount of discharge from the lithium-ion battery 12 to protect the battery 12 from overdischarge. For the protective control, the controller 20 constantly acquires detection values of the terminal voltages Vc and Vd or the open-circuit voltage VO (Li) of the lithium-ion battery 12, as well as a current value of the current passing through the lithium-ion battery 12, the current value being detected by a current detecting section (means), which is not shown. For example, when the terminal voltage Vd of the lithium-ion battery 12 in a discharging state becomes lower than a lower limit voltage, the lithium-ion battery 12 is ensured to be protected from overdischarge by being charged from the rotary machine 10. The lower limit voltage can be set on the basis of a voltage corresponding to a lower limit value (10%) of the SOC range of use. The controller 20 gives an instruction to the regulator in respect of the variable setting of the regulated voltage Vreg to prevent the terminal voltage Vc of the lithium-ion battery 12 from exceeding an upper limit voltage to thereby protect the battery 12 from overcharge. The upper limit voltage can be set on the basis of a voltage corresponding to an upper limit value (90%) of the SOC range of use.

As to the lead battery 11, the similar protective control is performed by another battery controller, which is not shown.

In the present embodiment, regenerative energy of the vehicle is used to have the rotary machine 10 generate electric power for charging the batteries 11 and 12 (the lithium-ion battery 12 mainly), that is, deceleration regeneration is performed. The deceleration regeneration is performed upon establishment of such conditions as that the vehicle is in deceleration and fuel injection to the engine is cut.

In the present embodiment, the lithium-ion battery 12 is ensured to be preferentially charged/discharged, of the two batteries 11 and 12. As a configuration for this purpose, the characteristics of the batteries 11 and 12 are determined as follows. The details are described referring to FIGS. 2A, 2B and 3.

Figure 2A:
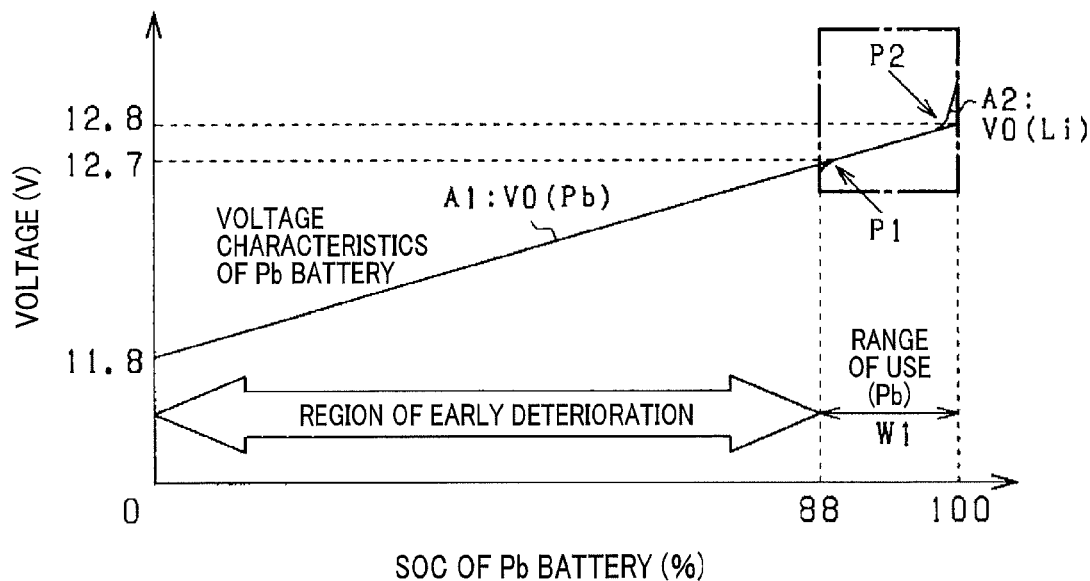
FIGS. 2A and 2B illustrate graphs depicting SOC ranges of use of a lead battery and a lithium-ion battery, respectively.
Figure 2B:
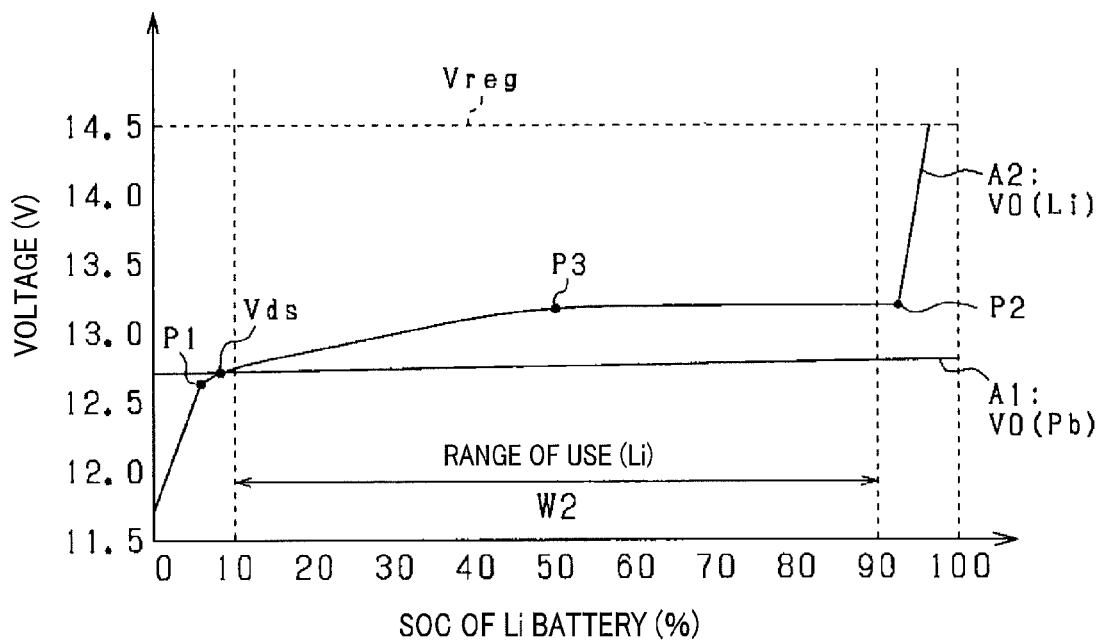
Figure 3:
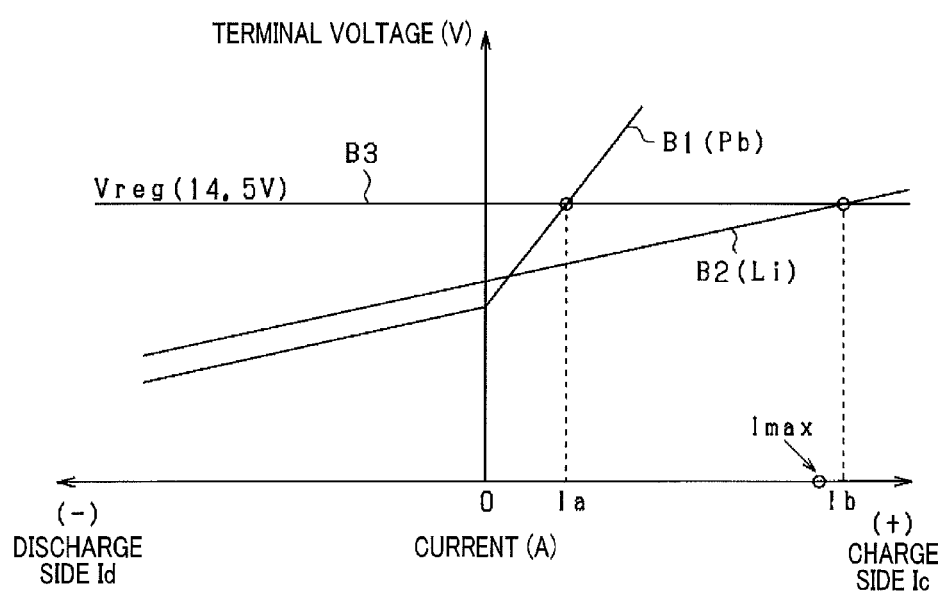
FIG. 3 illustrates a graph depicting differences in I-V characteristics between a lead battery and a lithium-ion battery.

FIGS. 2A and 2B illustrate graphs depicting SOC ranges of use of the lead battery 11 and the lithium-ion battery 12, respectively. FIG. 3 illustrates a graph depicting differences in I-V characteristics between the lead battery 11 and the lithium-ion battery 12. In FIG. 2A, the horizontal axis indicates the SOC of the lead battery 11, and the solid line A1 is a voltage characteristics line indicating a relationship between the SOC and the open-circuit voltage VO(Pb) of the lead battery 11. In proportion to the increase of the SOC accompanying the increase of the amount of charge, the open-circuit voltage VO(Pb) increases. In FIG. 2B, the horizontal line indicates the SOC of the lithium-ion battery 12, and the solid line A2 is a voltage characteristics line indicating a relationship between the SOC and the open-circuit voltage VO(Li) of the lithium-ion battery 12. With the increase of the SOC accompanying the increase of the amount of charge, the open-circuit voltage VO(Li) also increases. In the increase of the open-circuit voltage VO(Li), the inclination of the voltage characteristics line A2 is smaller between inflection points P1 and P2 at which the inclination is drastically changed.

Overcharge or overdischarge of the batteries 11 and 12 causes a concern of early deterioration. Therefore, the protective control described above is performed to limit the amount of charge or discharge of each of the batteries 11 and 12 to the range (SOC range of use) for avoiding overcharge or overdischarge. For example, a SOC range of use W1(Pb) of the lead battery 11 is SOC 88% to 100%, while a SOC range of use W2(Li) of the lithium-ion battery 12 is SOC 10% to 90%. The upper limit of the range of use W2(Li) is smaller than 100% and the lower limit is larger than 0%.

In the lead battery 11, SOC 0% to 88% is the range that causes early deterioration. It should be noted that FIG. 2B is an enlarged view of the portion indicated by the dash-dot line in FIG. 2A (portion indicating the range of use W1(Pb)). Thus, a position SOC=0% of the lithium-ion battery 12 shown in the horizontal axis of FIG. 2B corresponds to the value 88% of the range of use W1(Pb).

Battery characteristics of the lithium-ion battery 12 are determined such that the lithium-ion battery 12 will have voltage characteristics that satisfy the following requirements (a), (b), (c), (d) and (e). These settings can be realized by setting the open-circuit voltages V0 and the internal resistances R of the batteries 11 and 12. The settings of the open-circuit voltages V0 can be realized by selecting the positive electrode active material, the negative electrode active material and the electrolyte of the lithium-ion battery 12.

<Requirement (a)>

Within the entire SOC range (0 to 100%) of the lithium-ion battery 12, a point Vds, as defined below, resides in a specific region that is a region on a low SOC side relative to the SOC range of use W2(Li). The point Vds is defined to be a point where the open-circuit voltage VO(Li) of the lithium-ion battery 12 coincides with the open-circuit voltage VO(Pb) of the lead battery 11. In addition, within the entire range of the SOC range of use W2(Li), the relation "open-circuit voltage VO(Li)>open-circuit voltage VO(Pb)" is established. In the characteristics shown in FIG. 2B, the inflection points P1 and P2 are set on a low SOC side and a high SOC side, respectively, relative to the range of use W2(Li). Further, in the voltage characteristics line A2, the point Vds is set on a high SOC side relative to the inflection point P1. Alternatively, however, the point Vds can be set on a low SOC side relative to the inflection point P1.

<Requirement (b)>

The internal resistance R(Li) of the lithium-ion battery 12 and the internal resistance R(Pb) of the lead battery 11 are set so as to satisfy "R(Li)<R(Pb)" in a charging state and satisfy "R(Li)≤R(Pb)" in a discharging state. In this case, the differences in the I-V characteristics between the batteries 11 and 12 are as shown in FIG. 3. In FIG. 3, the solid line B1 indicates the I-V characteristics of the lead voltage 11, the solid line B2 indicates the I-V characteristics of the lithium-ion battery 12, and the solid line B3 indicates the regulated voltage Vreg. Further, the horizontal axis in the graph of FIG. 3 indicates current values Ic and Id, and the vertical axis indicates the terminal voltages Vc and Vd. The current Ic in a charging state is indicated by a plus sign, while the current Id in a discharging state is indicated by a minus sign.

The I-V characteristics B1 and B2 show that the terminal voltage Vc increases (the SOC increases) in proportion to the increase of the charge current Ic, and the terminal voltage Vd decreases (the SOC decreases) in proportion to the decrease of the discharge current Id. The inclinations of the I-V characteristics B1 and B2 represent the respective internal resistances R. In the lithium-ion battery 12, the internal resistance R(Li) remains unchanged between the charge and discharging states. In the lead battery 11, however, the internal resistance R(Pb) in the charging state is larger than the internal resistance R(Pb) in the discharging state. For this reason, the internal resistances are determined so as to satisfy "R(Li)<R(Pb)" in a charging state and satisfy "R(Li)≤R(Pb)" in a discharging state.

Additionally, when the electrical loads 14 are in an activated state (discharging state), the terminal voltages are set so as to satisfy Vd(Li)>Vd(Pb). In a charging state created by the rotary machine 10, the terminal voltages are set so as to satisfy Vc(Li)>Vc(Pb) in a range where Ic is approximate to zero, but to satisfy Vc(Li)<Vc(Pb) outside this range. Such settings are realized when the internal resistance R(Li) of the lithium-ion battery 12 in a charging state is smaller than the internal resistance R(Pb) of the lead battery 11.

<Requirement (c)>

The terminal voltage Vc(Li) of the lithium-ion battery 12 in a state where the maximum charge current is passed therethrough is smaller than the regulated voltage Vreg in a power-generation state of the rotary machine 10. In other words, the terminal voltage Vc(Li) of the lithium-ion battery 12 in a charging state, i.e. the value of the terminal voltage Vc(Li) at the upper limit value (90%) in the SOC range of use W2(Li), is smaller than the regulated voltage Vreg.

<Requirement (d)>

The inclination of the voltage characteristics line A2 (inclination representing change of open-circuit voltage relative to SOC) is different between a low SOC side and a high SOC side relative to an intermediate point P3 which is set in the SOC range of use W2(Li) of the lithium-ion battery 12. In other words, the voltage characteristics line A2 draws a curve projected upward. In this case, the inclination (average inclination) of the voltage characteristics line A2 is larger on the low SOC side than on the high SOC side. The intermediate point P3 does not have to be necessarily situated at the center of the SOC range of use W2(Li), but may be situated somewhat nearer to the upper limit value or somewhat nearer to the lower limit value.

<Requirement (e)>

The voltage characteristics line A2 of the lithium-ion battery 12 has a comparatively small inclination in a region between the inflection points P1 and P2, and has a larger inclination in regions on a low SOC side relative to P1 and on a high SOC side relative to P2 than in the region between the inflection points P1 and P2.

Figure 4:
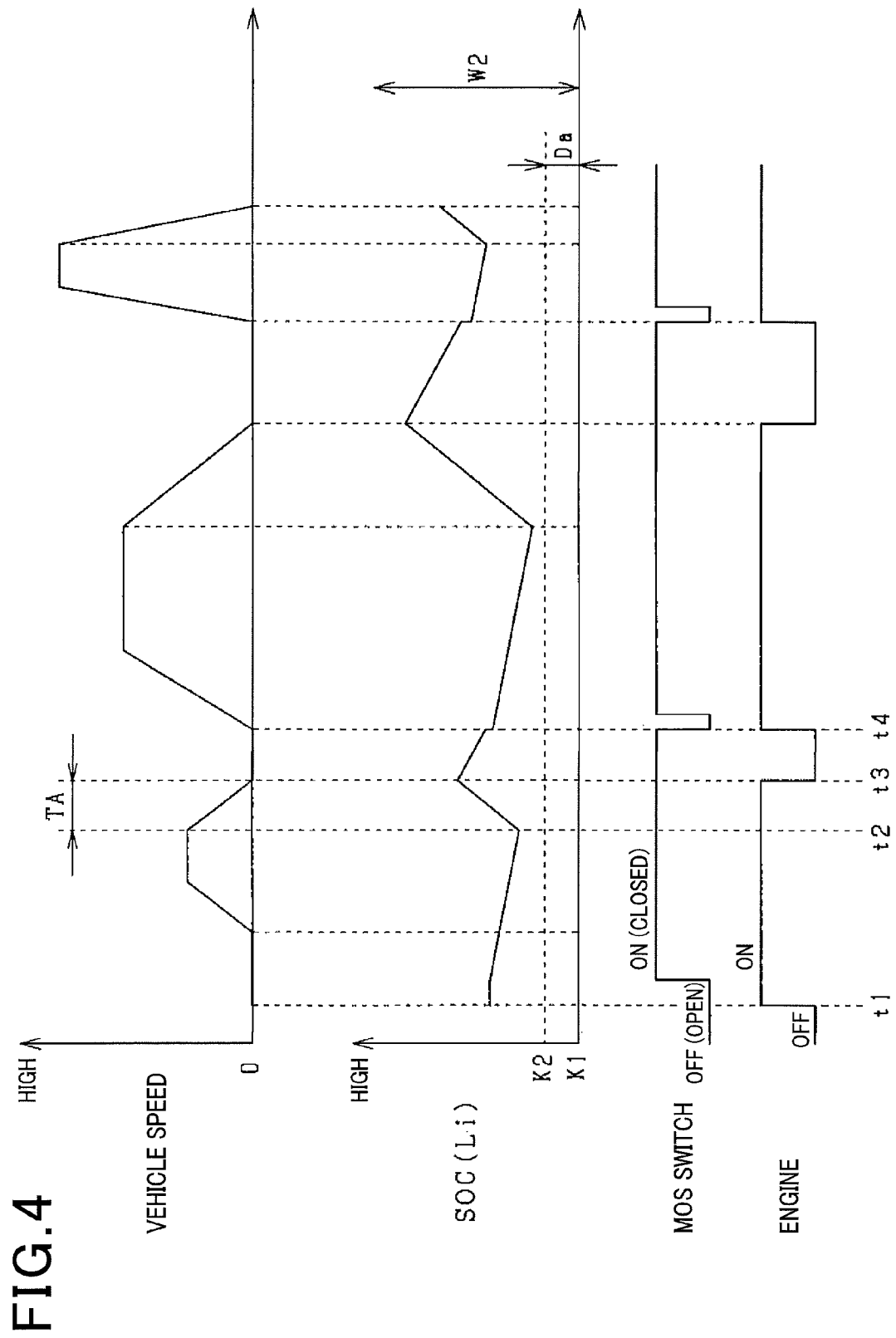
FIG. 4 illustrates a time diagram depicting correlation between a running state of a vehicle and charge/discharge of a lithium-ion battery.

FIG. 4 illustrates a time diagram depicting correlation between running state of a vehicle and charge/discharge of the lithium-ion battery 12.

In FIG. 4, at time t1, the starter 13 initially starts the engine. The MOS switch 15, which is in an off state then, is turned on when the starter 13 has completed the engine start. After that, the MOS switch 15 is retained to be in an on state under the condition where the engine is in operation, the on state being retained covering a period of regenerative charge (period TA in FIG. 4) performed by the rotary machine 10. Under the condition where the MOS switch 15 is in an on state, the SOC(Li) gradually decreases due to the power supply (discharge) from the lithium-ion battery 12 to the electrical loads 14 in a state other than a regenerative-charging state (period TA) created by the rotary machine 10, but the SOC(Li) increases in the regenerative-charging state.

Specifically, after the MOS switch 15 is turned on but before time t2, the lithium-ion battery 12 is preferentially discharged, of the two batteries 11 and 12. Then, at time t2, the vehicle starts deceleration, followed by automatic engine stop under idle stop control. In this case, the SOC(Li) increases in a period between times t2 and t3 due to the regenerative charge. Then, in a period between times t3 and t4 when the engine is stopped, the lithium-ion battery 12 discharges power to the electrical loads 14. In this condition, the rotary machine 10 cannot perform power generation (regenerative generation or engine-driven generation), and therefore the decrease rate of the SOC(Li) is larger compared to when the engine is in operation.

Then, at the time of restart at time t4, the MOS switch 15 is temporarily turned off upon establishment of restart conditions, and in this state, the engine is restarted by the rotary machine 10. At the engine restart, a comparatively large current is passed from the lithium-ion battery 12 to the rotary machine 10. However, since the MOS switch 15 has been turned off, power supply from the lead battery 11 to the rotary machine 10 is prohibited to prevent lowering of the SOC of the lead battery 11.

After that, similarly, the MOS switch 15 is retained to be in an on state except for the restart period following the automatic engine stop. Thus, the SOC(Li) is increased and decreased in a manner similar to the period between times t1 to t4. The MOS switch 15 may be turned off in either of the regenerative-charging state created by the rotary machine 10 or the load-activated state.

As mentioned above, the rotary machine 10 cannot perform power generation (regenerative generation or engine-driven generation) while the engine is automatically stopped. In this case, a limitless duration of engine stop can excessively decrease the SOC(Li). Accordingly, it is desirable that an allowable duration of engine stop is determined (e.g., two minutes). Determining an allowable duration of engine stop corresponds to determining a discharge limit (maximum allowable amount of discharge) during engine stop.

In this case, as shown in FIG. 4, the controller 20 determines the maximum allowable amount of discharge Da that can be allowed while the engine is automatically stopped. At the same time, the controller 20 obtains a SOC by adding the maximum allowable amount of discharge Da to a lower limit K1 of the range of use W2 of the lithium-ion battery 12, and sets the obtained SOC as an essential lower limit K2 in the range of use W2. Then, under the condition where the engine is in operation, the controller 20 controls the SOC of the lithium-ion battery 12 so as not to fall below the essential lower limit value K2 in the range of use W2. In the present embodiment, it is ensured that "open-circuit voltage VO(Li)>open-circuit voltage VO(Pb)" is satisfied throughout the range of use W2. Accordingly, the essential lower limit value K2 can be determined with reference to the lower limit K1 of the range of use W2 to thereby allow the lithium-ion battery 12 to discharge power within the full range of use W2.

According to the present embodiment described above, the following beneficial advantageous effects can be obtained.

The lead battery 11 and the lithium-ion battery 12 are configured as follows.

In a region on a low SOC side relative to the range of use W2 in the entire SOC range (0 to 100%) of the lithium-ion battery 12, there is provided a point where the open-circuit voltage of the lithium-ion battery 12 coincides with that of the lead battery 11. Further, in the range of use W2 of the lithium-ion battery 12, it is ensured that "Li open-circuit voltage>Pb open-circuit voltage" is satisfied. Accordingly, power is preferentially discharged from the lithium-ion battery 12 throughout the range of use W2 to thereby decrease the accumulated amount of discharge as much as possible in the lead battery 11. Furthermore, in a charging state, the lithium-ion battery 12 is permitted to have a smaller internal resistance than that of the lead battery 11. Accordingly, in a charging state, power is preferentially charged to the lithium-ion battery 12. These approaches are effective in avoiding deterioration of the lead battery 11.

The voltage characteristics lines A1 and A2 of the batteries 11 and 12 are not completely separated from each other throughout the SOC range, but are ensured to intersect with each other on a low SOC side relative to the range of use W2. Accordingly, while the lithium-ion battery 12 is ensured to be preferentially charged/discharged in the range of use W2, it is ensured that the voltage will not be excessively different from the regulated voltage Vreg derived in the power-generation state of the rotary machine 10. In this way, the efficiency of charge is ensured to be enhanced.

Further, combination of the battery characteristics described above can drastically decrease the opportunities of opening/closing the MOS switch 15. This reduces the probability of causing power supply loss which would otherwise be caused by leaving the MOS switch 15 open (in an off state). In other words, the MOS switch 15 is retained to be in a closed state in both of the power-generation state of the rotary machine 10 and the load-activated state. Accordingly, the probability of causing open failure (turn-off failure) is reduced in the MOS switch 15, which leads to elimination of disadvantages such as of causing instantaneous or continuous power supply loss that would be induced by the open failure. In short, power can be stably supplied to the electrical loads 14.

As described so far, in the power supply apparatus including the lead battery 11 and the lithium-ion battery 12 of high energy density, charge/discharge of the batteries 11 and 12 can be properly performed. The charge/discharge frequency of the lead battery 11 is ensured to be lowered, and the engine restart under idle stop control is ensured to be performed by the power supply of the lithium-ion battery 12. With this configuration, an inexpensive battery can be used as the lead battery 11. Accordingly, the cost incurred is expected to be reduced.

In the range of use W2 of the lithium-ion battery 12, the voltage characteristics line A2 (see FIG. 2B) draws a curve projected upward. Thus, the voltage characteristics line A2 has a larger inclination on the low SOC side relative to the intermediate point in the range of use W2 than on the high SOC side. In this case, the voltage characteristics line A2 has a small inclination on the high SOC side of the range of use W2 and therefore the voltage can be easily ensured in relation to the regulated voltage Vreg derived in a regenerative-generation state, irrespective of the SOC. In this way, the charge efficiency of the lithium-ion battery 12 can be enhanced.

Since the voltage characteristics line A2 has a comparatively large inclination on the low SOC side of the range of use W2, the accuracy of SOC calculation (SOC sensitivity) can be enhanced relative to a voltage detection value of the lithium-ion battery 12. This is convenient for figuring out a margin for the lower limit value in the range of use W2, in respect of the SOC of the lithium-ion battery 12. This is also convenient for avoiding overdischarge of the lithium-ion battery 12.

In the voltage characteristics line A2 of the lithium-ion battery 12, the inflection points P1 and P2 are ensured to be set on the low SOC side and the high SOC side, respectively, relative to the range of use W2. Thus, in charging power to the lithium-ion battery 12 within the range of use W2 by regenerative generation, the charge efficiency is prevented from being lowered, which would have been caused when the open-circuit voltage (terminal voltage) is excessively close to the regulated voltage Vreg. In other words, in a region of high SOC in the range of use W2, the efficiency of regenerative charge is prevented from being lowered due to the drastic increase of the open-circuit voltage. Further, the difference between a Pb open-circuit voltage and a Li open-circuit voltage can be made as small as possible at the lower limit SOC in the range of use W2, contributing as well to preventing lowering of the efficiency of regenerative charge.

The voltage characteristics line A2 has an inclination which is steeper on the low SOC side and the high SOC side relative to the range of use W2 than in the range of use W2. Accordingly, SOC calculation sensitivity can be enhanced in the regions of the low SOC side and the high SOC side relative to the range of use W2. In the event that the SOC resides in these regions, the state can be appropriately obtained.

The MOS switch 15 is ensured to be in an off state (open state) when the engine is restarted by driving the rotary machine 10 (starting unit) under idle stop control. In this case, in restarting the engine by the rotary machine 10, power is supplied from the lithium-ion battery 12 to the rotary machine 10 in a state where, in principle, the batteries 11 and 12 are electrically disconnected from each other. Accordingly, no load of power supply is imposed on the lead battery 11 at the time of engine restart. This realizes a configuration which is advantageous in minimizing the accumulated amount of discharge in the lead battery 11.

A SOC obtained by adding the maximum allowable amount of discharge Da to the lower limit value K1 in the range of use W2 of the lithium-ion battery 12 is set as the essential lower limit K2 in the range of use W2. In a state where the engine is in operation, the SOC of the lithium-ion battery 12 is ensured to be controlled so as not to fall below the essential lower limit value K2 in the range of use W2. Thus, power is properly discharged from the lithium-ion battery 12 no matter whether the engine is stopped or in operation. In other words, in this case, the range of use W2 satisfying the relation "open-circuit voltage V0(Li)>open-circuit voltage V0(Pb)" can be fully used to properly discharge power from the lithium-ion battery 12.

The configuration of the above embodiment utilizes the lithium-ion battery 12 that is a battery based on a non-aqueous electrolyte solution. Thus, for example, compared to the case where a nickel storage battery is used, energy density is higher, and the open-circuit voltage and the inner resistance can be easily set so as to satisfy the voltage characteristics shown in FIG. 2B.

In the configuration of the above embodiment, the negative electrode active material of the lithium-ion battery 12 that can be used includes any of carbon, graphite, lithium titanate, an alloy that contains Si, and an alloy that contains Sn, and the positive electrode active material of the lithium-ion battery 12 that can be used includes lithium metal composite oxide. Thus, the open-circuit voltage and the inner resistance can be easily set so as to again satisfy the voltage characteristics shown in FIG. 2B. The material used for the positive electrode active material of the lithium-ion battery 12 may be lithium iron phosphate.

Second Embodiment

Figure 5:
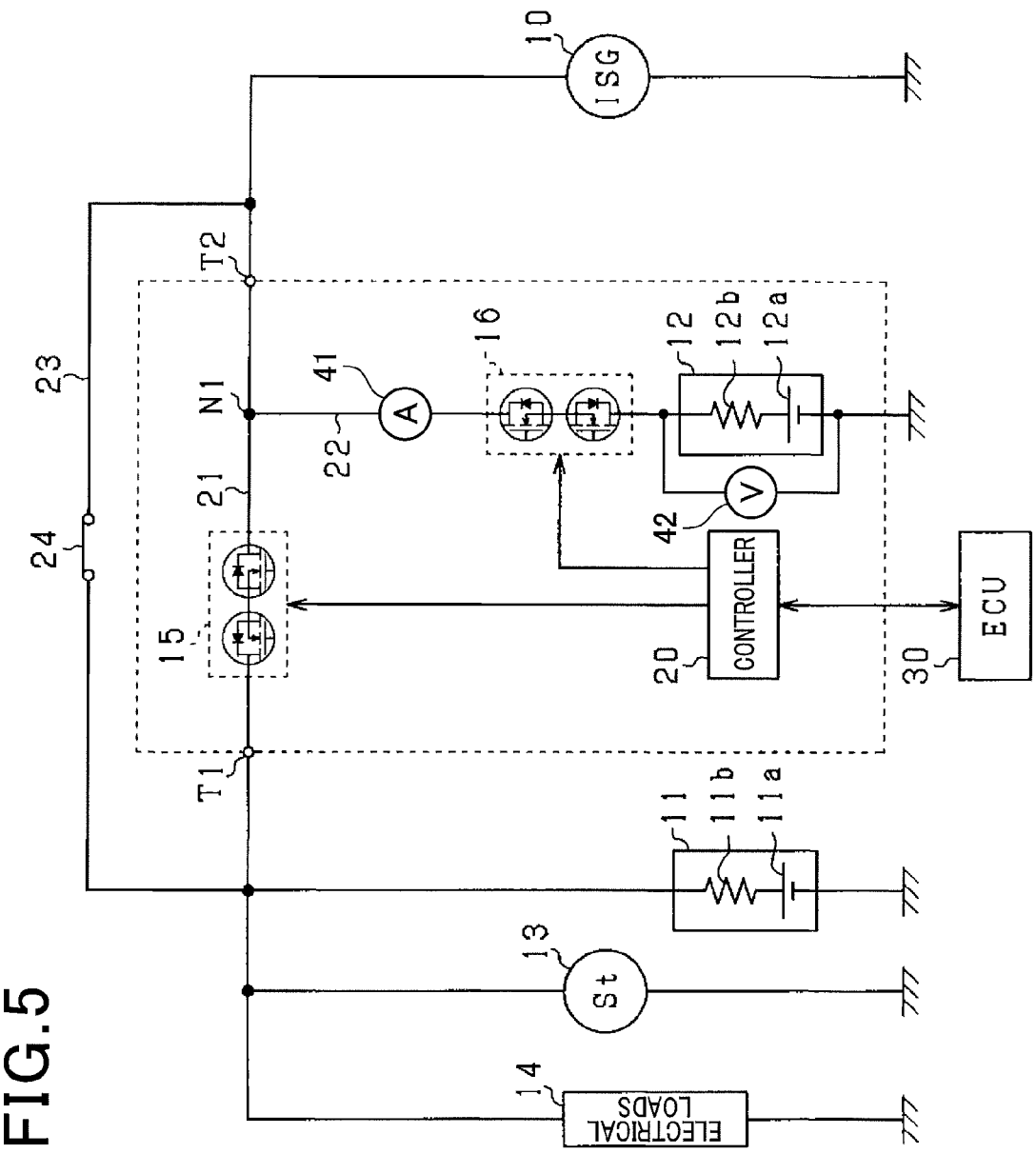
FIG. 5 is an electrical circuit diagram illustrating a power supply system according to a second embodiment.

Next, the second embodiment is described focusing on the differences from the first embodiment. FIG. 5 shows a power supply system according to the second embodiment. The basic configuration of the power supply system of the second embodiment is the same as that shown in FIG. 1. Specifically, a current sensor 41 and a voltage sensor 42 are explicitly shown. The current sensor 41 detects a current (charge/discharge current) flowing through the lithium-ion battery 12. The voltage sensor 42 detects a terminal voltage of the lithium-ion battery 12.

Figure 6:
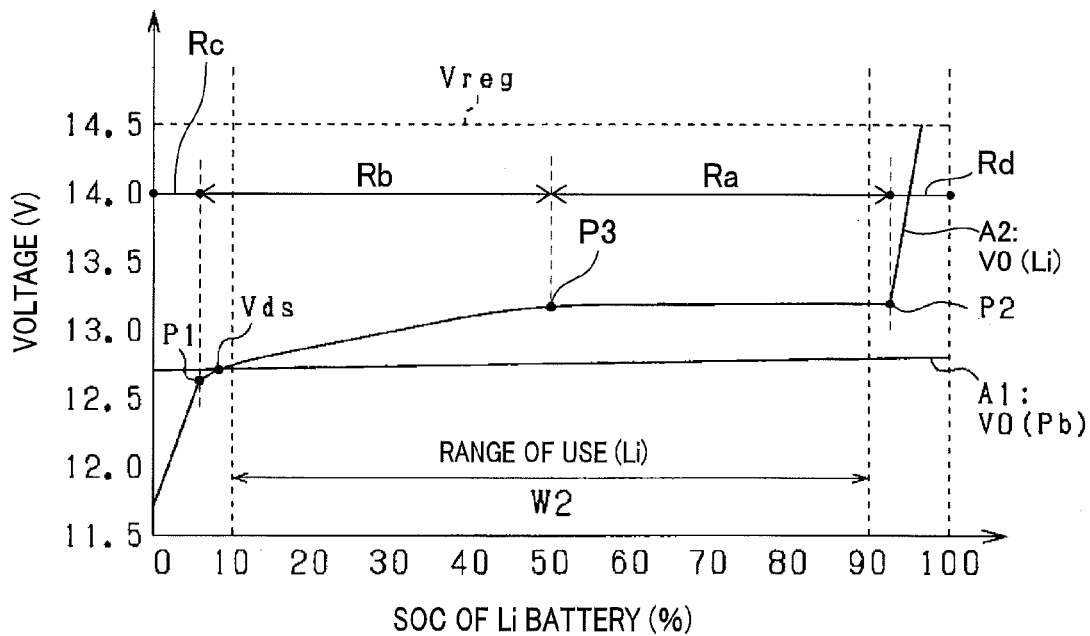
FIG. 6 illustrates voltage characteristics of a lithium-ion battery.

In the present embodiment, an SOC is calculated by a calculation method suited for each region, considering the following matters in FIG. 6 illustrating voltage characteristics of the lithium-ion battery 12:

(1) The range of use W2 overlaps with a high SOC region Ra and a low SOC region Rb. In the high SOC region Ra, an inclination representing change of the open-circuit voltage V0 relative to the SOC is smaller than that in the low SOC region Rb.

(2) There are steep regions Rc, Rd, in which the inclination representing change of the open-circuit voltage V0 relative to the SOC is steeper than that in the range of use W2, on the lower SOC side relative to the low SOC region Rb and the higher SOC side relative to the high SOC region Ra.

Note that the high SOC region Ra corresponds to a first region. The low SOC region Rb and the steep regions Rc, Rd correspond to a second region. If the intermediate point P3 exists in the range of use W2, a boundary portion of the regions Ra, Rb may be defined at P3 or in the vicinity thereof.

In this case, a first calculation process and a second calculation process described later are used as an SOC calculation process. The calculation processes are used properly depending on the region in which the lithium-ion battery 12 resides. In the first calculation process, an SOC in the lithium-ion battery 12 is calculated based on the sum of the charge/discharge currents. More specifically, the controller 20 calculates an initial value of the SOC based on a measurement value of the open-circuit voltage V0 in a state where the switches 15, 16 are turned off (opened), that is, in a state where a charge/discharge current is not flowing through the lithium-ion battery 12. Thereafter, the controller 20 successively updates the SOC by adding or subtracting the sum of the charge/discharge currents to or from the SOC in a state where the switches 15, 16 are turned on (closed), that is in a state where a charge/discharge current is flowing through the lithium-ion battery 12. For example, the controller 20 updates the SOC by using the following expression 1:

$$SOC[\%]=SOC0+100\times\int Idt/Qmax \qquad (1)$$

where SOC0 is a previous value of the SOC, I is a current detection value, and Qmax is an amount of full charge of the lithium-ion battery 12.

In addition, in the second calculation process, an SOC is calculated based on the open-circuit voltage V0 of the lithium-ion battery 12 by using correlation characteristics defining a relationship between the SOC and the open-circuit voltage V0 of the lithium-ion battery 12. More specifically, the controller 20 estimates every time the open-circuit voltage V0 based on a terminal voltage (closed circuit voltage) of the lithium-ion battery 12, an internal resistance value, and a value of charge/discharge current in a state the switches 15, 16 are turned on. Then, the controller 20 calculates the SOC based on a V0 estimate value by using the voltage characteristics (correlative relationship) shown in FIG. 6.

Referring to, for example, the high SOC region Ra and the low SOC region Rb in the range of use W2, in the high SOC region Ra, since the inclination representing change of the open-circuit voltage V0 relative to the SOC is smaller, the SOC is not easily determined uniquely with respect to the open-circuit voltage V0. However, the SOC can be calculated accurately based on the balance of the SOC obtained from the sum of the currents. In addition, in the low SOC region Rb, since the inclination representing change of the open-circuit voltage V0 relative to the SOC is larger, the SOC is easily determined uniquely with respect to the open-circuit voltage V0. Hence, referring to the voltage characteristics can accurately calculate the SOC.

Specifically, in the present embodiment, the SOC is calculated in the first region (high SOC region Ra) by the first calculation process. In addition, while assuming that the SOC is calculated in the second region (low SOC region Rb and steep regions Rc, Rd) by the second calculation process, the SOC is calculated in the low SOC region Rb of the second region by using the first calculation process and the second calculation process in combination, and the SOC is calculated in the steep regions Rc, Rd by using the second calculation process alone.

Note that, in the high SOC region Ra, change of the open-circuit voltage V0 relative to the SOC is hardly caused. Hence, in the high SOC region Ra, input performance of the battery determined by the difference between the Vreg and the open-circuit voltage V0 is substantially constant. Even if considering an error in the current sensor 41, calculating the SOC from summing the currents can be applied.

When using the first calculation process and the second calculation process in combination, for example, the SOC calculated by the first calculation process (summing the currents) and the SOC calculated by the second calculation process (referring to the voltage characteristics) may be integrated with predetermined weighting to use the result as the SOC of the lithium-ion battery 12. In this case, in both the low SOC region Rb and the steep regions Rc, Rd, an inclination representing change of the open-circuit voltage V0 relative to the SOC is larger than that in the high SOC region Ra. In the low SOC region Rb, an inclination representing change of the open-circuit voltage V0 relative to the SOC is smaller than those in the steep regions Rc, Rd. In this regard, in the low SOC region Rb, calculating the SOC by using the first calculation process and the second calculation process in combination can improve the accuracy in calculating the SOC.

In the whole low SOC region Rb, V0(Li)>V0(Pb) is established, and the SOC is calculated by using the first calculation process and the second calculation process in combination.

Figure 7:
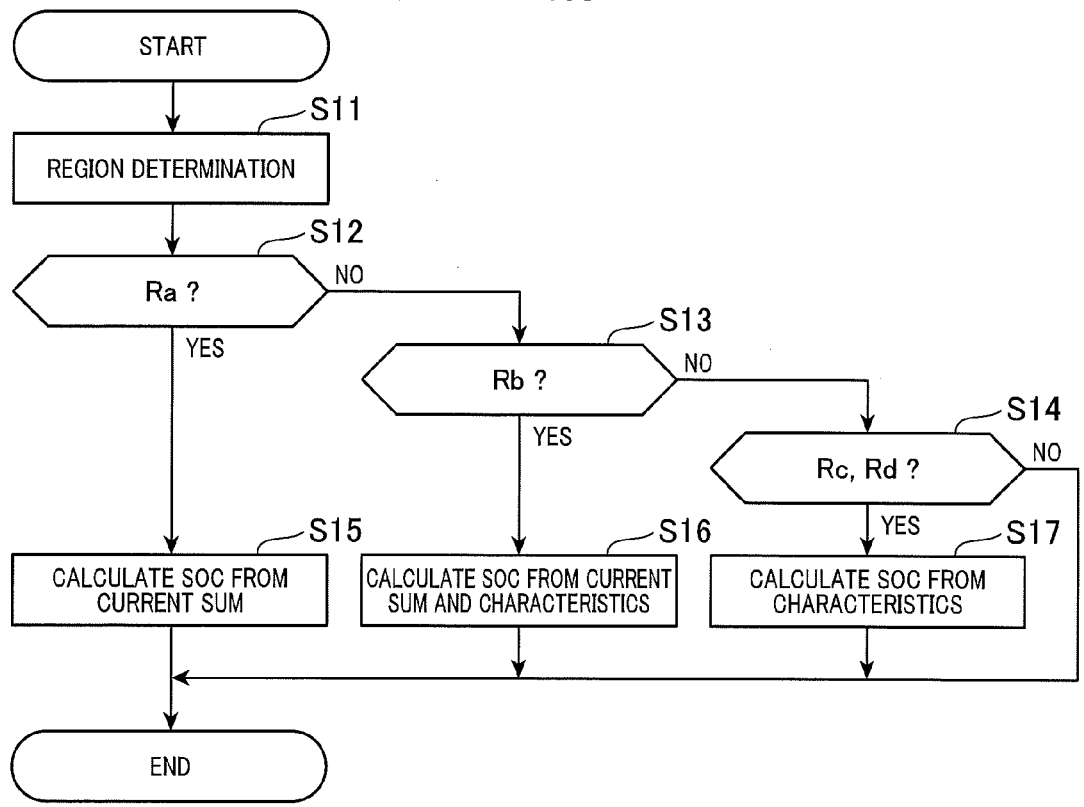
FIG. 7 is a flowchart illustrating a procedure of SOC calculation.

Next, a procedure of SOC calculation performed by controller 20 (including a first calculation section (means), a second calculation section (means), and a region determination section (means)) is described with reference to the flowchart shown in Fig. The process of FIG. 7 is repeatedly performed by the controller 20 at predetermined intervals.

In FIG. 7, in step S11, the controller 20 determines the region in which the lithium-ion battery 12 is in at the present time among the regions Ra to Rd (one of the regions Ra to Rd in which the lithium-ion battery 12 is in at the present time). In this case, the controller 20 may calculate the amount of change of the open-circuit voltage V0 or a value corresponding to the amount of change in a situation in which a charge/discharge current flows through the lithium-ion battery 12, to perform the region determination based on the amount of change of the open-circuit voltage V0 or the value corresponding thereto.

Specifically, the controller 20 performs the region determination based on the amount of change of the open-circuit voltage V0 obtained before and after a predetermined period of time has passed in a situation in which a charge/discharge current flows through the lithium-ion battery 12, or based on the ratio between the amount of change of the open-circuit voltage V0 and the amount of charge/discharge within predetermined period of time. In this case, a threshold value is defined for each of the regions, and the region determination is performed based on the comparison with the threshold value. In addition, the controller 20 can perform the region determination based on the difference between closed circuit voltages obtained before and after a predetermined period of time has passed in a state of stable current. Alternatively, the region determination may be performed based on the previous SOC or open-circuit voltage by using the correlation characteristics defining a relationship between the SOC and the open-circuit voltage.

Then, if the result of the region determination is the region Ra, the controller 20 makes affirmative determination in step S12 and proceeds to step S15 to calculate the SOC from summing the currents (first calculation process). If the result of the region determination is the region Rb, the controller 20 makes affirmative determination in step S13 and proceeds to step S16 to calculate the SOC from summing the currents and referring to the voltage characteristics (first calculation process and second calculation process). If the result of the region determination is the region Rc or Rd, the controller 20 makes affirmative determination in step S14 and proceeds to step S17 to calculate the SOC from referring to the voltage characteristics (second calculation process).

According to the present embodiment described above, the following beneficial advantageous effects can be obtained.

In the voltage characteristics of the lithium-ion battery 12, the inclination representing change of the open-circuit voltage V0 relative to the SOC differs between the regions (Ra to Rd) in which the SOC or the open-circuit voltage V0 serves as a parameter. However, considering this, the SOC can be appropriately calculated by the appropriate calculation method. Hence, the accuracy in calculating the SOC can be improved.

In the voltage characteristics of the lithium-ion battery 12, four regions Ra to Rd are defined depending on the inclination representing change of the open-circuit voltage V0 relative to the SOC, and individual SOC calculation processes are set for the regions Ra to Rd. Hence, the SOC can appropriately be calculated by properly performing two types of calculation processes.

When the SOC of the lithium-ion battery 12 is within the low SOC region Rb, the SOC is calculated by using both the first calculation process and the second calculation process. In this case, in the low SOC region Rb, while the inclination representing change of the open-circuit voltage V0 relative to the SOC is larger than that in the high SOC region Ra, while the inclination is smaller than those in the steep regions Rc, Rd. However, considering this, the SOC calculation can be realized which is appropriate in the whole SOC region. Using both the first calculation process and the second calculation process can absorb the error of one of the calculation processes by the other of the calculation processes.

Note that, in the voltage characteristics of the lithium-ion battery 12, the first calculation process and the second calculation process may be selectively used between the high SOC region Ra and the other regions. In this case, the SOC is calculated by the first calculation process alone in the high SOC region Ra, and the SOC is calculated by the second calculation process alone in the regions other than the high SOC region Ra (regions Rb to Rd).

In addition, in the range of use W2, the region boundary portion may be variably set which separates the high SOC region Ra and the low SOC region Rb from each other. For example, the region boundary portion is changed, for example, depending on a charging/discharging state, that is, between a state where a charging state of the lithium-ion battery 12 continues and a state where a discharging state of the lithium-ion battery 12 continues. In this case, in the state where charging continues, the boundary portion is shifted to the high SOC side to extend the region of the second calculation process. In the state where discharging continues, the boundary portion is shifted to the low SOC side to extend the region of the first calculation process. That is, hysteresis is provided on the boundary portion of Ra/Rb.

In the above configuration, the high SOC region Ra is defined as a first region, and the low SOC region Rb and the steep regions Rc, Rd are defined as a second region. Alternatively, the high SOC region Ra and the low SOC region Rb may be defined as a first region, and the steep regions Rc, Rd may be defined as a second region. In this case, the SOC is calculated by the first calculation process alone in the high SOC region Ra and the low SOC region Rb, and the SOC is calculated by the second calculation process alone in the steep regions Rc, Rd.

Other Embodiments

For example, the foregoing embodiment may be modified as follows.

Figure 8A:
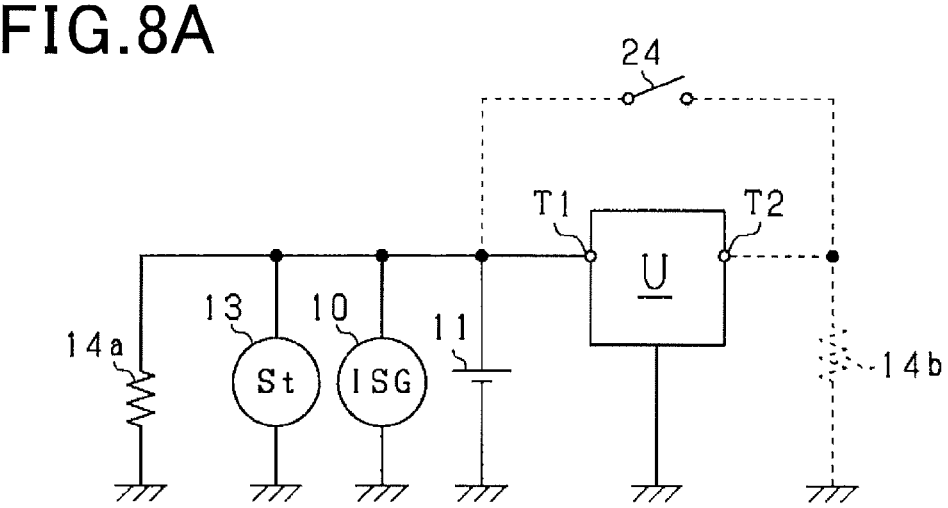
FIGS. 8A, 8B and 8C are electrical circuit diagrams illustrating configurations of other power supply systems.
Figure 8B:
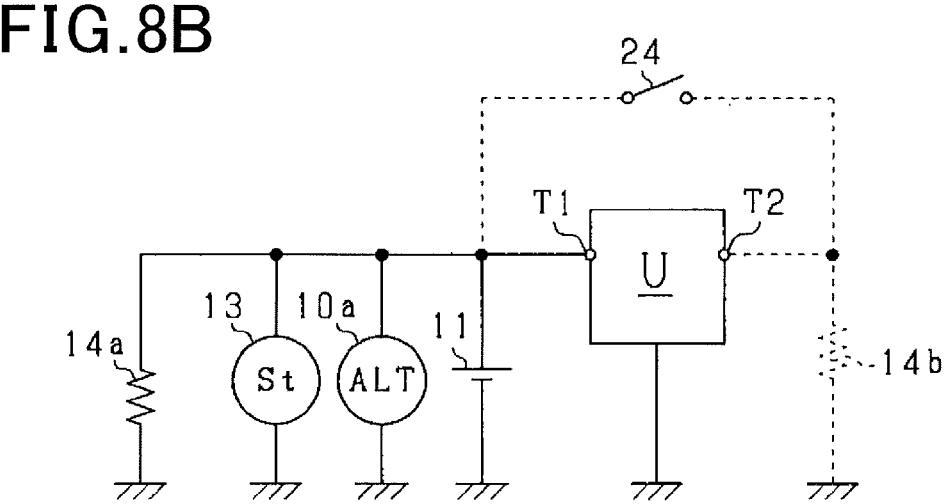
Figure 8C:
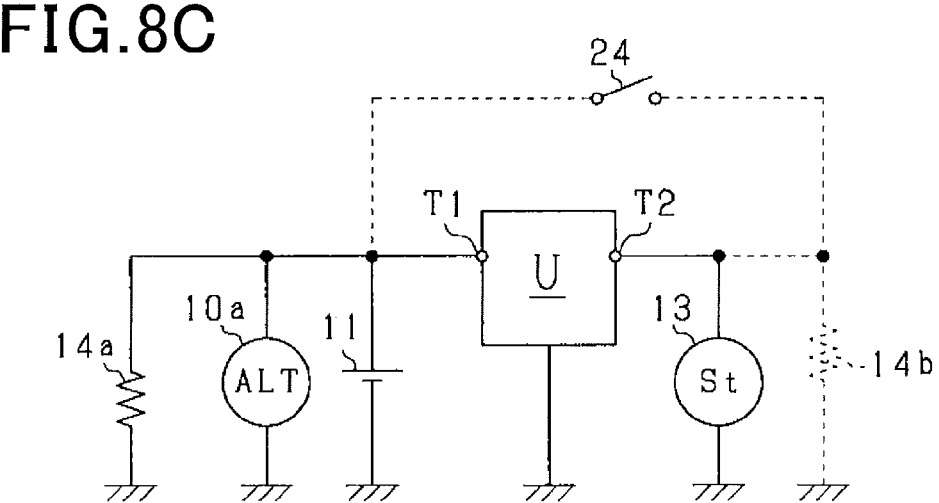

In the configuration of the foregoing embodiment, the starter 13 and the electrical loads 14 are provided on a lead battery 11 side (first terminal T1 side), and the rotary machine 10 configured by an ISG (integrated starter generator) is provided on a lithium-ion battery 12 side (second terminal T2 side), with the intervention of the MOS switch 15 inbetween. However, this configuration may be modified. FIGS. 8A, 8B and 8C are electrical circuit diagrams illustrating configurations of other power supply systems. For example, as shown in FIG. 8A, the rotary machine 10 and electrical loads 14a may be collectively provided on the first terminal T1 side. In this case, electrical loads may be or may not be provided on the second terminal T2 side. If electrical loads 14b are provided on the second terminal T2 side as indicated by the dashed line in FIG. 8A, a bypass switch 24 can be provided in the bypass path connecting between the T1 side and the T2 side (the same applies to FIGS. 8B and 8C described below).

As shown in FIG. 8B, an alternator 10a serving as a power generator and a starter 13 serving as a starting unit may be provided on the first terminal T1 side. Further, as shown in FIG. 8C, the alternator 10a serving as a power generator may be provided on the first terminal T1 side, and the starter 13 serving as a starting unit may be provided on the second terminal T2 side.

In the configuration of the foregoing embodiment, the vehicle is initially started by the power supply from the lead battery 11 (start by the starter 13), and is restarted under idle stop control by the power supply from the lithium-ion battery 12 (start by the rotary machine 10). This may be modified. For example, the initial start and the restart may both be performed by the power supply from the lithium-ion battery 12. In this case, both of initial start and restart may be performed by the rotary machine 10.

In the foregoing embodiment, the voltage characteristics line A2 of the lithium-ion battery 12 draws a curve projected upward. This may be modified. For example, the voltage characteristics line A2 may draw a straight or substantially straight line. Alternatively, the voltage characteristics line A2 may draw a curve projected downward.

In the foregoing embodiment, the inflection points P1 and P2 are positioned on the low SOC side and the high SOC side relative to the range of use W2 in the voltage characteristics line A2 of the lithium-ion battery 12. This may be modified. For example, the inflection point P1 may be positioned on a high SOC side relative to the lower limit value in the range of use W2, or the inflection point P2 may be positioned on a low SOC side relative to the upper limit value in the range of use W2.

In the foregoing embodiment, the lithium-ion battery 12 that is a battery based on a non-aqueous electrolyte solution is used as the second battery that exhibits the voltage characteristics line A2. However, the second battery of the present invention should not be construed as being limited to the lithium-ion battery 12. As far as the requirements (a) to (e), particularly the requirements (a) to (c), are satisfied, any battery may be used, such as a nickel storage battery that includes an electrode made of a nickel compound.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a power supply apparatus includes a generator (10), a lead battery (11), and a second battery (12), the lead battery and the second battery being connected in parallel with the generator. Electric power is supplied from the lead battery and the second battery to an electrical load (14). The apparatus includes: a protective control section (means) (20) which limits an amount of charge to the second battery to protect the second battery from overcharge, while limiting an amount of to discharge from the second battery to protect the second battery from overdischarge, such that a residual capacity of the second battery falls within a predetermined range of use determined in an entire residual capacity range; an opening/closing section (means) (15) which is provided to a connection path (21) electrically connecting between the lead battery and the second battery and is turned on and off to connect and disconnect between the lead battery and the second battery; and an opening/closing control section (means) (20) which controls the opening/closing section (means).

In addition, open-circuit voltages and internal resistances of the lead battery and the second battery are determined so that: there is provided a point, where the open-circuit voltage of the second battery coincides with the open-circuit voltage of the lead battery, in a region on a smaller residual capacity side relative to the range of use in the entire residual capacity range of the second battery; the open-circuit voltage of the second battery is larger than the open-circuit voltage of the lead battery in the range of use of the second battery; the internal resistance of the second battery is smaller than the internal resistance of the lead battery in a charging state created by power generation of the generator; and a terminal voltage of the second battery in a state where a maximum charge current is passed through the second battery is smaller than a regulated voltage in a power-generation state of the generator. The opening/closing control section (means) makes the opening/closing section (means) an off state in at least one of the power-generation state of the generator and a load-activated state where the electrical load is activated.

In the above configuration, the opening/closing section (means) is closed in at least one of a power-generation state where power is generated by the generator and a load-activated state where the electrical loads are activated, so that the lead battery and the second battery can be brought into a state of being electrically connected to each other. In this case, when there is a difference in the terminal voltages of these batteries, the difference will cause the current to flow from a high-voltage side battery to a low-voltage side battery. However, the lead battery and the second battery of the embodiment are configured as follows.

In a region on a smaller residual capacity side relative to a range of use (W2) in the entire residual capacity range (0 to 100%) of the second battery, there is provided a point where the open-circuit voltage of the second battery coincides with that of the lead battery. Further, in the range of use (W2) of the second battery, the open-circuit voltage of the second battery is ensured to be larger than that of the lead battery. Accordingly, in both of a charging state created by the power generation of the generator and a discharging state for activating the electrical loads, a state of "open-circuit voltage of second battery>open-circuit voltage of lead battery" is retained. In this case, throughout the range of use of the residual capacity of the second battery, power is preferentially discharged from the second battery and thus the accumulated amount of discharge of the lead battery can be decreased as much as possible. Since the internal resistance of the second battery is smaller than that of the lead battery in the charging state created by the power generation of the generator, power is preferentially supplied to the second battery in the charging state. These approaches are effective for avoiding deterioration of the lead battery.

The voltage characteristics lines (characteristics lines each indicating a relationship between residual capacity and open-circuit voltage) of the lead battery and the second battery are not completely separated from each other throughout the entire residual capacity range, but are ensured to intersect with each other on a smaller residual capacity side relative to the range of use of the second battery. Accordingly, while the second battery is ensured to be preferentially charged/discharged within the range of use, it is ensured that the voltage will not be excessively different from the regulated voltage derived in the power-generation state of the rotary machine. In this way, the efficiency of charge is ensured to be enhanced.

Further, combination of the battery characteristics described above can drastically decrease the opportunities of opening/closing the opening/closing section (means). This reduces the probability of causing power supply loss which would otherwise be caused by leaving the opening/closing section (means) open (in an off state). In other words, the opening/closing section (means) is retained to be in a closed state in both of the power-generation state of the generator and the load-activated state. Accordingly, the probability of causing open failure (turn-off failure) is reduced in the opening/closing section (means), which leads to elimination of disadvantages such as of causing instantaneous or continuous power supply loss that would be induced by the open failure. In short, power can be stably supplied to the electrical loads.

As a technique that can cope with the open failure of the opening/closing section (means), there is proposed a technique of providing a bypass path taking a detour around the opening/closing section (means) and providing a bypass relay in the bypass path. However, such a technique can cause an instantaneous power supply loss if there is a delay between the recognition of the open failure and the closing of the bypass relay. Further, for the compensation of the delay in the operation of the bypass relay, a backup circuit or the like is requited to be additionally provided to the configuration. In this regard, the configuration of the embodiment can lower the probability of causing power supply loss, while preventing the configuration from becoming complicated.

As described above, in the power supply apparatus including the lead battery and the second battery, the batteries can be properly charged/discharged.

What is claimed is:

1. A power supply apparatus which includes a generator, a lead battery, and a second battery, the lead battery and the second battery being connected in parallel with the generator, and in which electric power is supplied from the lead battery and the second battery to an electrical load, the apparatus comprising:

a protective control section which limits an amount of charge to the second battery to protect the second battery from overcharge, while limiting an amount of discharge from the second battery to protect the second battery from overdischarge, such that a residual capacity of the second battery falls within a predetermined range of use determined in an entire residual capacity range;

an opening/closing section which is provided to a connection path electrically connecting between the lead battery and the second battery and is turned on and off to connect and disconnect between the lead battery and the second battery; and an opening/closing control section which controls the opening/closing section, wherein open-circuit voltages and internal resistances of the lead battery and the second battery are determined so that there is provided a point, where the open-circuit voltage of the second battery coincides with the open-circuit voltage of the lead battery, in a region on a smaller residual capacity side relative to the range of use in the entire residual capacity range of the second battery, the open-circuit voltage of the second battery is larger than the open-circuit voltage of the lead battery in the range of use of the second battery, the internal resistance of the second battery is smaller than the internal resistance of the lead battery in a charging state created by power generation of the generator, and a terminal voltage of the second battery in a state where a maximum charge current is passed through the second battery is smaller than a regulated voltage in a power-generation state of the generator, and the opening/closing control section makes the opening/closing section an off state in at least one of the power-generation state of the generator and a load-activated state where the electrical load is activated.

2. The power supply apparatus according to claim 1, wherein
an inclination representing change of the open-circuit voltage relative to the residual capacity is different between a smaller residual capacity side and a larger residual capacity side relative to an intermediate point in the range of use of the second battery, and the inclination is larger on the smaller residual capacity side than on the larger residual capacity side.

3. The power supply apparatus according to claim 1, wherein
a voltage characteristics line representing change of the open-circuit voltage relative to the residual capacity in the entire residual capacity range of the second battery has inflection points at which the inclination is changed, and the inflection points are respectively set on a smaller residual capacity side and a larger residual capacity side relative to the range of use in the entire residual capacity range.

4. The power supply apparatus according to claim 1, wherein
the second battery has a voltage characteristic including a first region in which an inclination representing change of the open-circuit voltage relative to the residual capacity is smaller, and a second region in which the inclination representing change of the open-circuit voltage relative to the residual capacity is larger than that in the first region,
the apparatus further comprises:
a first calculation section which calculates, in a state where the second battery resides in the first region, the residual capacity of the second battery based on a sum of the charge/discharge currents in the second batter, and
a second calculation section which calculates, in a state where the second battery resides in the second region, the residual capacity of the second battery based on the open-circuit voltage of the second battery by using a correlation characteristic defining a relationship between the residual capacity and the open-circuit voltage of the second battery.

5. The power supply apparatus according to claim 4, further comprising a region determination section which calculates an amount of change of the open-circuit voltage or a value corresponding to the amount of change in a situation in which a charge/discharge current flows through the second battery, to determine whether the second battery is in a state of residing in the first region or in a state of residing in the second region, based on the amount of change of the open-circuit voltage or the value corresponding to the amount of change or based on the residual capacity or the open-circuit voltage obtained by using a correlation characteristic defining a relationship between the residual capacity and the open-circuit voltage.

6. The power supply apparatus according to claim 4, wherein
the voltage characteristic of the second battery includes, as regions overlapping with the range of use, a high SOC region in which the residual capacity is higher, and a low SOC region in which the residual capacity is lower than that in the high SOC region and in which the inclination representing change of the open-circuit voltage relative to the residual capacity is larger than that in the high SOC region,
the voltage characteristic of the second battery has steep regions in which the inclination representing change of the open-circuit voltage relative to the residual capacity is steeper than that in the range of use, on a lower SOC side relative to the low SOC region and a higher SOC side relative to the high SOC region,
the first calculation section calculates the residual capacity of the second battery when the residual capacity of the second battery is in the high SOC region, assuming that the second battery resides in the first region, and
the second calculation section calculates the residual capacity of the second battery when the residual capacity of the second battery is in the low SOC region and the steep region, assuming that the second battery resides in the second region.

7. The power supply apparatus according to claim 6, wherein
the first calculation section performs a first calculation process calculating the residual capacity based on the sum of the charge/discharge currents and a second calculation process calculating the residual capacity by using the correlation characteristic,
when the residual capacity of the second battery is in the high SOC region, the first calculation section calculates the residual capacity of the second battery by the first calculation process,
when the residual capacity of the second battery is in the low SOC region, the second calculation section calculates the residual capacity of the second battery by both the first calculation process and the second calculation process, and
when the residual capacity of the second battery is in the steep region, the second calculation section calculates the residual capacity of the second battery by the second calculation process.

8. The power supply apparatus according to claim 1, wherein
the apparatus is installed in a vehicle,
the vehicle has an automatic stop and restart function under which an engine is automatically stopped when a predetermined automatic stop condition is satisfied, and the engine is automatically restarted by a starting unit when a predetermined restart condition is satisfied after the engine is automatically stopped,
the starting unit is connected to one side of the connection path and the electrical load is connected to the other side of the connection path, with an intervention of the opening/closing section inbetween, and
the opening/closing control section makes the opening/closing section an on state when the engine is started by the starting unit.

9. The power supply apparatus according to claim 8, wherein
the generator is connected to the engine so as to be driven and has a function of the starter, and
the generator is connected to on a second battery side of the connection path relative to the opening/closing section, and the electrical load is connected to a lead battery side of the connection path relative to the opening/closing section.

10. The power supply apparatus according to claim 8, wherein
a maximum allowable amount of discharge, which is allowed while the engine is automatically stopped, is determined, and a residual capacity, which is obtained by adding the maximum allowable amount of discharge to a lower limit value of the range of use of the second battery, is set as an essential lower limit value in the range of use, and the apparatus further comprises a discharge control section which, under a condition where the engine is in operation, controls the residual capacity of the second battery so as not to fall below the essential lower limit value in the range of use.

\* \* \* \* \*